US008498254B2

United States Patent
Dai et al.

(10) Patent No.: US 8,498,254 B2
(45) Date of Patent: Jul. 30, 2013

(54) DISTRIBUTING METHOD FOR PHYSICAL HYBRID ARQ INDICATOR CHANNEL RESOURCES

(75) Inventors: Bo Dai, Shenzhen (CN); Shuqiang Xia, Shenzhen (CN); Chunli Liang, Shenzhen (CN); Peng Hao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 512 days.

(21) Appl. No.: 12/865,250

(22) PCT Filed: Jul. 25, 2008

(86) PCT No.: PCT/CN2008/071767
§ 371 (c)(1),
(2), (4) Date: Jul. 29, 2010

(87) PCT Pub. No.: WO2009/100631
PCT Pub. Date: Aug. 20, 2009

(65) Prior Publication Data
US 2010/0332937 A1    Dec. 30, 2010

(30) Foreign Application Priority Data
Feb. 2, 2008    (CN) .......................... 2008 1 0009496

(51) Int. Cl.
| | |
|---|---|
| H04W 4/00 | (2009.01) |
| H04W 40/00 | (2009.01) |
| H04L 12/26 | (2006.01) |
| H04L 27/06 | (2006.01) |
| H04L 27/28 | (2006.01) |
| H04B 1/00 | (2006.01) |
| H04B 1/707 | (2011.01) |

(52) U.S. Cl.
USPC ........... 370/329; 370/341; 370/343; 370/344; 370/395.4; 370/431; 375/260; 375/130; 375/146

(58) Field of Classification Search
USPC ................. 370/203–204, 206, 208, 252, 310, 370/319, 328–330, 438, 341–344, 395.4, 370/431; 375/130, 146, 260
See application file for complete search history.

(56) References Cited

U.S. PATENT DOCUMENTS

| | | | |
|---|---|---|---|
| 7,852,806 B2 * | 12/2010 | Ahn et al. ..................... 370/329 |
| 2009/0109906 A1 * | 4/2009 | Love et al. ..................... 370/329 |

(Continued)

FOREIGN PATENT DOCUMENTS

| | | |
|---|---|---|
| CN | 1605173 A | 4/2005 |
| CN | 1630227 A | 6/2005 |

(Continued)

OTHER PUBLICATIONS

International Search Report, Oct. 2008.

(Continued)

Primary Examiner — Asad Nawaz
Assistant Examiner — Wutchung Chu
(74) Attorney, Agent, or Firm — Banner & Witcoff, Ltd.

(57) ABSTRACT

A method for allocating resources of physical hybrid ARQ indicator channels is disclosed, comprising: a transmitting end dividing evenly all resources of Physical Hybrid ARQ Indicator Channels (PHICHs) to be allocated into a plurality of configured PHICH groups, and then mapping them to sub-carriers of resource groups corresponding to the PHICH groups to transmit signals in the PHICHs through the sub-carriers. The present invention enables Hybrid Automatic Repeat reQuest function to be implemented in a practical system, and also ensures minimum interference between different users and improves the utilization of system resources.

9 Claims, 5 Drawing Sheets

U.S. PATENT DOCUMENTS

| | | | | |
|---|---|---|---|---|
| 2009/0147743 | A1* | 6/2009 | Parkvall et al. | 370/329 |
| 2009/0201904 | A1* | 8/2009 | Lee et al. | 370/342 |
| 2009/0245187 | A1* | 10/2009 | Nam et al. | 370/329 |
| 2010/0002647 | A1* | 1/2010 | Ahn et al. | 370/329 |
| 2010/0054161 | A1* | 3/2010 | Montojo et al. | 370/280 |
| 2010/0246455 | A1* | 9/2010 | Nangia et al. | 370/280 |
| 2010/0260057 | A1* | 10/2010 | Lee et al. | 370/252 |
| 2010/0284360 | A1* | 11/2010 | Dalsgaard et al. | 370/329 |
| 2012/0140724 | A1* | 6/2012 | Sipola et al. | 370/329 |
| 2012/0183101 | A1* | 7/2012 | Murakami et al. | 375/324 |

FOREIGN PATENT DOCUMENTS

| | | |
|---|---|---|
| CN | 101043493 A | 9/2007 |
| CN | 101094214 A | 12/2007 |
| CN | 101227739 A | 7/2008 |

OTHER PUBLICATIONS

3GPP TSG RAN WG1 #51bis, RI-080537, Sevilla, Spain, Jan. 14-18, 2008, Agenda item 6.1.3, L.G. Electronics "PHICH to RE Mapping".

3GPP TSG RAN WG1 Meeting #51, R1074773, Jeju, Korea, Nov. 5-9, 2007, Agenda Itern 6.2.3, Samsung, "PH\CH/PDCCH to RE Mapping".

TSG-RAN-WG1 #51 bis, R1-080342, Seville, Spain, Jan. 14-18, 2008, Ericsson, "Summary of Emaii Discussion on DL Control Signaling", Agenda Item 6.1.3.

PHICH Assignment for TDD and FDD E-UTRA (Motorola), 3GPP TSG RAN1 #51bis Sevilla, Spain, Jan. 14-18, 2007, RI-080071, Agenta Iten 6.1.3.

* cited by examiner

DISTRIBUTING METHOD FOR PHYSICAL HYBRID ARQ INDICATOR CHANNEL RESOURCES

TECHNICAL FIELD

The present invention relates to a method for allocating physical channel resources in a mobile communication system, and in particular, to a method for allocating resources of Physical Hybrid ARQ Indicator Channels (PHICHs) in a wide-band wireless system.

BACKGROUND OF THE INVENTION

Rapid development of digital communication system brings about higher requirements on reliability of data communication, however, in a bad channel environment, especially in a high data rate or high-speed movement environment, multi-path interference, Doppler frequency shift and the like will severely affect the system performance. Therefore, effective error control technique, especially HARQ (Hybrid Automatic Repeat reQuest) technique becomes a hot point of the research made on communication field.

In HARQ mode, the codes transmitted by a transmitting end are not only able to detect errors, but also have a certain error-correcting capability. After receiving codes, a decoder at the receiving end firstly detects errors: if the errors are within the error-correcting capability of the codes, then the errors are corrected automatically; if there are too many errors that they go beyond the error-correcting capability of the codes, but the errors can be detected, then the receiving end transmits a decision signal to the transmitting end via a feedback channel to ask the transmitting end to re-transmit the information.

In an OFDM (Orthogonal Frequency Division Multiplexing) system, an ACK/NACK (Acknowledged/Non-Acknowledged) control signaling is used to indicate whether the transmitted information is correct or erroneous, thereby determining whether the information needs to be re-transmitted or not.

At present, it is specified in LTE (Long Term Evolution) system that an ACK/NACK message related to uplink data is transmitted in PHICH. One ACK/NACK message corresponds to one PHICH.

One ACK/NACK message corresponds to 1-bit original information, and then the 1-bit original information is encoded repeatedly for three times and then is k-times spectrum spread, becoming m bits, wherein m=3×k; after BPSK (Binary Phase Shift Keying) modulation, m bits are respectively mapped to 3 resource groups, each of which includes 4 physical sub-carriers. When the cyclic prefix is a normal cyclic prefix, k=4; when the cyclic prefix is an extended cyclic prefix, k=2, in which case, two PHICHs can be mapped to three same resource groups for frequency division multiplexing. Meanwhile, two PHICHs can be multiplexed on the same physical sub-carrier via I path and Q path.

Generally, as for normal cyclic prefix and extended cyclic prefix, allocation of PHICH resources should be performed by dividing a plurality of PHICHs into several groups according to its spectrum spreading multiple k and the specification on the number of physical sub-carriers included in each resource group, and each group of PHICHs includes a plurality of orthogonal codes according to the corresponding two positions of orthogonal I path and Q path and the specification on spectrum spreading multiple.

Therefore, a mapping relationship between a PHICH and PHICH group, orthogonal codes and I/Q path has to be determined for both normal cyclic prefix and extended cyclic prefix so as to facilitate allocation of PHICH resources. This enables the HARQ function to be achieved in a practical system, but meanwhile requires assurance of minimum interference between users and high utilization of system resources to improve performance of the system. However, there is no preferable solution currently for solving the above problem.

SUMMARY OF THE INVENTION

The technical problem to be solved in the present invention is to provide a method for allocating resources of physical hybrid ARQ indicator channel (PHICH) in order to effectively solve the resource allocating problem between PHICH and PHICH group, orthogonal codes and I/Q path.

In order to solve the above problem, the present invention provides a method for allocating resources of physical hybrid ARQ indicator channels, comprising: a transmitting end dividing evenly all resources of the PHICHs to be allocated into a plurality of configured PHICH groups, and then mapping the divided PHICHs to sub-carriers of resource groups corresponding to the PHICH groups to transmit signals in the PHICHs through the sub-carriers.

Furthermore, the above method is also characterized in that: the transmitting end also allocating orthogonal codes and I path or Q path position resources for PHICHs in each PHICH group; wherein the transmitting end firstly evenly allocates the PHICHs to different PHICH groups; when the number of PHICHs in a group is less than or equal to half of a maximum number of PHICHs in each group, the PHICHs in the group are allocated to different orthogonal codes and I path or Q path positions of the orthogonal codes; when the number of PHICHs in a group increases gradually to exceed half of a maximum number of PHICHs in each group, a certain orthogonal code, and an I path or Q path position different from that of an existing PHICH using the orthogonal code are allocated for each newly increased PHICH.

Furthermore, the above method is also characterized in that: the method is applied to LTE system, the PHICHs are used to transmit ACK/NACK messages related to uplink data, one said PHICH corresponds to one said ACK/NACK message, one said ACK/NACK message becomes m bits after encoding repeatedly and spectrum spreading, wherein m=3× k, k is spectrum spreading multiple; after modulation, m bits are respectively mapped to 3 resource groups, each of which includes 4 physical sub-carriers;

when a cyclic prefix is a normal cyclic prefix, k=4, one said PHICH group includes at most 2×k said PHICHs, one said PHICH group includes k different said orthogonal codes, one orthogonal code corresponds to two positions of the I path and the Q path.

Furthermore, the above method is also characterized in that: as for all PHICH sequence numbers of #0. #1, . . . , #N−1, and all PHICH group sequence numbers of #0. #1, . . . , #M−1, the PHICH group sequence number corresponding to the $i^{th}$ PHICH is p, the corresponding PHICH logical number is s in the PHICH group p, then the PHICH group sequence number p and the PHICH logical number s are determined according to the following formula:

$$p = i \bmod M; s = \mathrm{floor}(i/M);$$

wherein: "mod" indicates modulo operation, floor( ) is a round-down function, M is a number configured for the PHICH groups;

said orthogonal codes include a first orthogonal code $w_0$, a second orthogonal code $w_1$, a third orthogonal code $w_2$ and a fourth orthogonal code $w_3$, and as for all of the PHICHs evenly divided according to the number M of the PHICH groups, a mapping relationship determined according to the PHICH logic number s in one PHICH group is as follows: PHICHs with a logic number s of 0, 1, 2 and 3 are sequentially mapped to $w_0$, $w_1$, $w_2$ and $w_3$ of the I path, and PHICHs with a logic number s of 4, 5, 6 and 7 are sequentially mapped to $w_0$, $w_1$, $w_2$ and $w_3$ of the Q path.

Furthermore, the above method is also characterized in that: when dividing the PHICHs and allocating orthogonal codes and I path or Q path position resources for the PHICHs, the mapping relationships between PHICH group sequence number p, an orthogonal code sequence number q and I path or Q path position r corresponding to the $i^{th}$ PHICH are respectively as indicated with the following formulas:

$p=i \bmod M; q=\text{floor}(i/M) \bmod k; r=\text{floor}(\text{floor}(i/M)/k) \bmod 2;$ wherein: "mod" indicates modulo operation, floor( ) is a round-down function, M is a number configured for the PHICH groups.

Furthermore, the above method is also characterized in that: the transmitting end also allocates orthogonal codes and I path or Q path position resources for the PHICHs in each PHICH group, and the PHICH groups include PHICH sub-groups;

wherein the transmitting end firstly evenly allocates PHICHs to different PHICH groups; when the number of PHICHs in a group is less than or equal to half of a maximum number of PHICHs in each group, the PHICHs in the group are allocated to orthogonal codes of different PHICH sub-groups or different orthogonal codes of the same PHICH sub-group, and I path or Q path positions of these orthogonal codes; when the number of PHICHs in a group increases gradually to exceed half of a maximum number of PHICHs in each group, a certain orthogonal code and an I path or Q path position different from that of an existing PHICH using the orthogonal code are allocated for each newly increased PHICH.

Furthermore, the above method is also characterized in that: the method is applied to LTE system, the PHICHs are used to transmit ACK/NACK messages related to uplink data, one said PHICH corresponds to one said ACK/NACK message, one said ACK/NACK message becomes m bits after repeated encoding and spectrum spread, wherein m=3×k, k is spectrum spreading multiple; after modulation, m bits are respectively mapped to 3 resource groups, each of which includes 4 physical sub-carriers;

when a cyclic prefix is an extended cyclic prefix, k=2, one said PHICH group includes at most 4×k said PHICHs, one said PHICH group includes 2 said PHICH sub-groups, one said PHICH sub-group includes k different orthogonal codes, one said orthogonal code corresponds to two positions of the I path and the Q path.

Furthermore, the above method is also characterized in that: as for all PHICH sequence numbers of #0, #1, ..., #N−1, and all PHICH group sequence numbers of #0, #1, ..., #M−1, the PHICH group sequence number corresponding to the $i^{th}$ PHICH is p, the corresponding PHICH logical number is s in the PHICH group p, then the PHICH group sequence number p and the PHICH logical number s are determined according to the following formulas:

$p=i \bmod M; s=\text{floor}(i/M);$ wherein: "mod" indicates modulo operation, floor( ) is a round-down function, M is a number configured for the PHICH groups;

said orthogonal codes include a first orthogonal code $w_0$ and a second orthogonal code $w_1$, and as for all of the PHICHs evenly divided according to the number M of the PHICH groups, a mapping relationship determined according to the PHICH logic number s in one PHICH group is as follows: PHICHs with a logic number s of 0, 1 are sequentially mapped to $w_0$ of the I path of the first PHICH sub-group and $w_0$ of the I path of the second PHICH sub-group; PHICHs with a logic number s of 2, 3 are sequentially mapped to $w_1$ of the I path of the first PHICH sub-group and $w_1$ of the I path of the second PHICH sub-group; PHICHs with a logic number s of 4, 5 are sequentially mapped to $w_0$ of the Q path of the first PHICH sub-group and $w_0$ of the Q path of the second PHICH sub-group; PHICHs with a logic number s of 6, 7 are sequentially mapped to $w_1$ of the Q path of the first PHICH sub-group and $w_1$ of the Q path of the second PHICH sub-group.

Furthermore, the above method is also characterized in that: when dividing the PHICHs and allocating orthogonal codes and I path or Q path position resources for the PHICHs, the mapping relationships between PHICH group sequence number p, a PHICH sub-group sequence number t, an orthogonal code sequence number q and I path or Q path position r corresponding to the $i^{th}$ PHICH are respectively as indicated with the following formulas:

$p=i \bmod M; t=\text{floor}(i/M) \bmod 2; q=\text{floor}(\text{floor}(i/M)/2) \bmod k;$ $r=\text{floor}(\text{floor}(\text{floor}(i/M)/2)/k) \bmod 2;$ wherein: "mod" indicates modulo operation, floor( ) is a round-down function, M is a number configured for the PHICH groups.

Furthermore, the above method is also characterized in that: the PHICHs at the same I path position and the PHICHs at the same Q path position within the first PHICH sub-group are mapped to two sub-carriers in the same resource group;

the PHICHs at the same I path position and the PHICHs at the same Q path position within the second PHICH sub-group are mapped to the other two sub-carriers in the same resource group.

The present invention provides a specific solution for mapping relationship between PHICH and PHICH groups, orthogonal codes and I/Q path, which enables Hybrid Automatic Repeat reQuest function to be implemented in a practical system, and also ensures minimum interference between different users and improves the utilization of system resources.

PREFERRED EMBODIMENTS OF THE INVENTION

The core idea of the method for allocating PHICH resources in accordance with the present invention is that a transmitting end divides evenly all resources of PHICHs to be allocated into a plurality of configured PHICH groups, then mapping them to sub-carriers of resource groups corresponding to the PHICH groups. When the number of PHICHs included by the transmitting end in each group is less than or equal to half of a maximum number of PHICHs included at most in each group, different orthogonal codes or orthogonal codes belonging to different PHICH sub-groups and I path or Q path position of the orthogonal codes are allocated for each PHICH.

The present invention does not only map each PHICH corresponding to one ACK/NACK message to sub-carriers of resource groups, but also evenly divides the PHICHs according to the order of groups, orthogonal codes and orthogonal I/Q position so as to achieve effects of maximum utilization of resources, minimum signal interference between users and minimum bit error rate.

According to different cyclic prefixes, the mapping method for PHICH resources of the present invention also varies. Therefore, discussions will be made differently for different cases.

(1) The Cyclic Prefix is a Normal Cyclic Prefix

Figure 1:
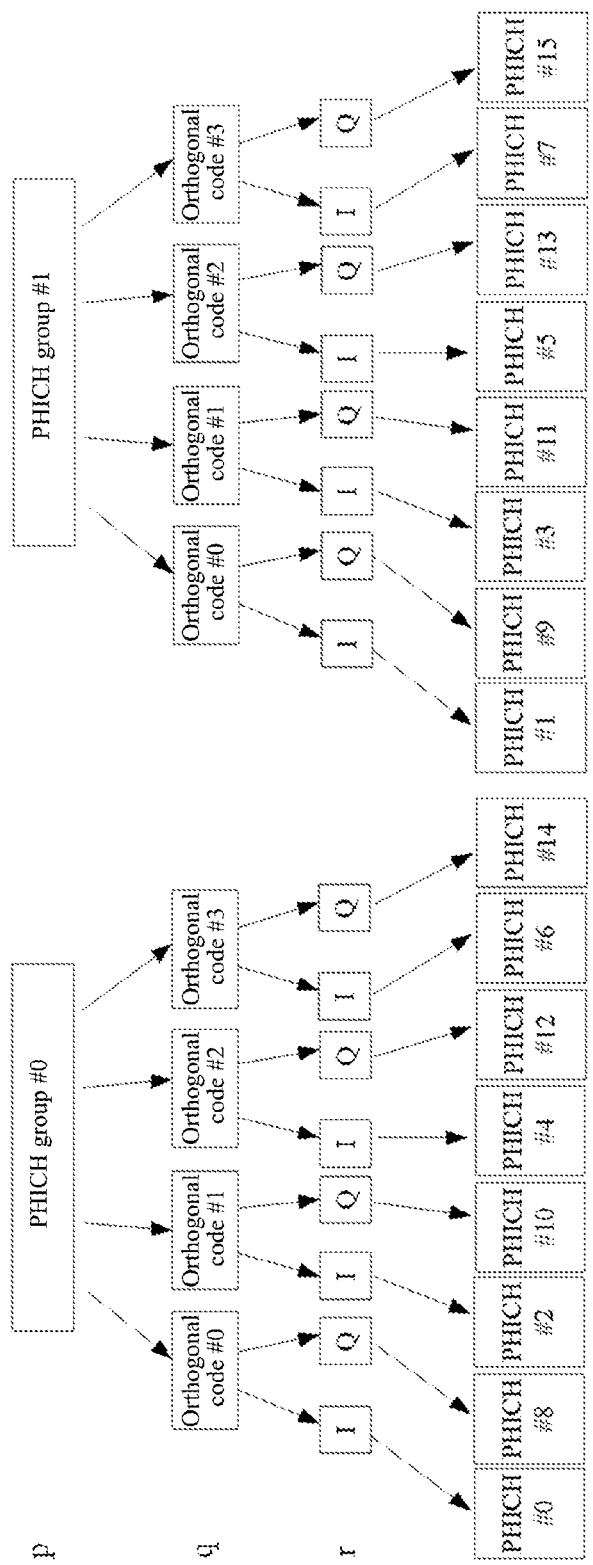
FIG. 1 is a schematic diagram for allocation of PHICH resources when a normal cyclic prefix is used according to one example of the present invention.

All of the PHICHs are mapped according to the following order: PHICH groups→orthogonal codes→I path or Q path position, and they are sequentially numbered, as shown in FIG. 1.

Assuming that all PHICHs are numbered as (#0, #1, ..., #N−1), PHICH groups are number as (#0, #1, ..., #M−1), orthogonal codes are numbered as (#0, #1, ..., #k−1) and I path and Q path positions are numbered as (#0, #1);

One PHICH group may include 2×k PHICHs, wherein one PHICH group includes k orthogonal codes, and one orthogonal code corresponds to two possible positions of I path and Q path; then the mapping relationship between the PHICH group sequence number p, orthogonal code sequence number q, and I/Q path position r corresponding to the $i^{th}$ PHICH is as shown in the following formula:

$$p = i \bmod M, q = \mathrm{floor}(i/M) \bmod k, r = \mathrm{floor}(\mathrm{floor}(i/M)/k) \bmod 2;$$

wherein "mod" indicates modulo operation, i.e., x mod y means performing modulo on parameter of x with respect to y;

floor( ) is a floor function, and the result from this function is a maximum integer that is not more than the parameter;

r=0 means at the I path position, r=1 means at the Q path position; or r=0 means at the Q path position, r=1 means at the I path position.

In addition to implementing resource mapping for PHICHs using the above formula, the mapping can also be implemented by way of a table. Assuming that all PHICHs are numbered as (#0, #1, ..., #N−1), PHICH groups are number as (#0, #1, ..., #M−1), the PHICH group sequence number corresponding to the $i^{th}$ PHICH is p, and the corresponding PHICH logic number in the PHICH group p is s, then:

$$p = i \bmod M; s = \mathrm{floor}(i/M);$$

when the spectrum spreading multiple k=4, one PHICH group may include 8 PHICHs (#0, #1, ..., #7), spectrum spreading codes are $w_0$, $w_1$, $w_2$ and $w_3$, then all PHICHs are firstly evenly divided according to the number of PHICH groups, then PHICHs in one PHICH group after even division are sequentially mapped as indicated in Table 1 (wherein the spectrum spreading codes are orthogonal codes).

TABLE 1 the corresponding relationship between PHICHs and spectrum spreading codes in the case of normal cyclic prefix

| PHICH logic numbers (s) | spectrum spreading codes k = 4 |
|---|---|
| 0 | $w_0$ of I path |
| 1 | $w_1$ of I path |
| 2 | $w_2$ of I path |
| 3 | $w_3$ of I path |
| 4 | $w_0$ of Q path |
| 5 | $w_1$ of Q path |
| 6 | $w_2$ of Q path |
| 7 | $w_3$ of Q path |
| Remarks | PHICH logic numbers are new numbers of all PHICHs after being evenly divided according to the number of PHICH groups | wherein, $w_0$, $w_1$, $w_2$, and $w_3$, may be {1,1,1,1}, {1,−1,1,−1}, {1,1,−1,1} and {1,−1,−1,1} respectively.

Figure 2:
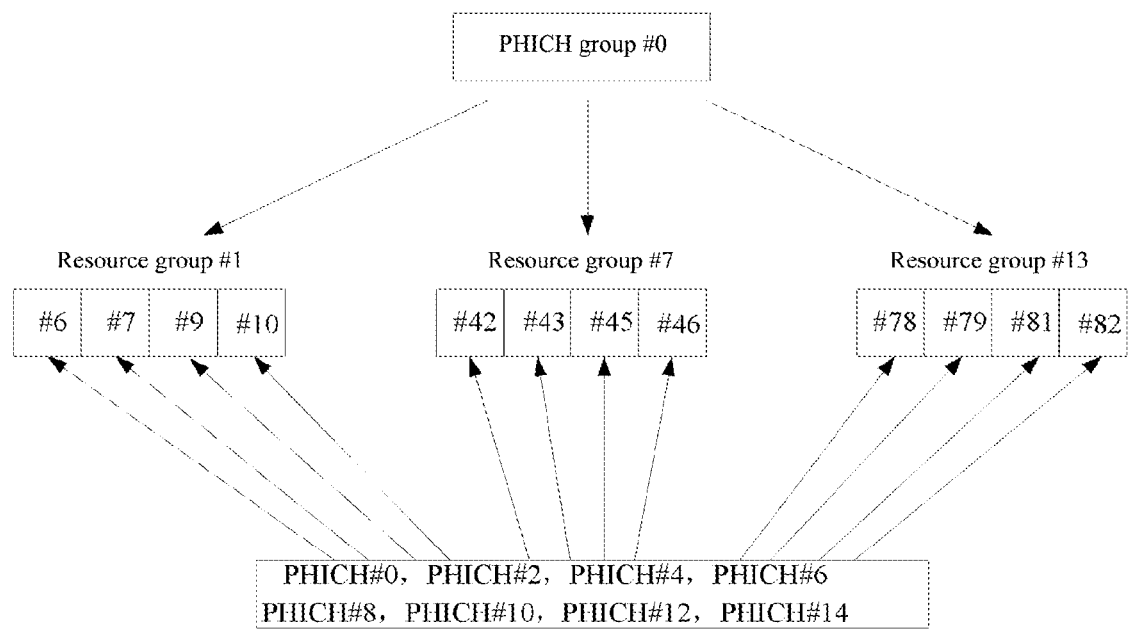
FIG. 2 is a schematic diagram for the mapping relationship between PHICH groups and sub-carriers of resource groups when a normal cyclic prefix is used according to one example of the present invention.

When the spectrum spreading multiple k=4, m=3×k=12, then one PHICH (i.e., one ACK/NACK message) corresponds to 12 bits that are respectively mapped to all the physical sub-carriers of 3 resource groups, and a plurality of PHICHs in one group can be all mapped to the same physical sub-carriers of the same resource groups in the above way, as shown in FIG. 2.

To sum up, all PHICHs are firstly evenly divided according to the number of the PHICH groups M, then PHICHs in each PHICH group are evenly divided according to the number of orthogonal codes k, and finally, the PHICHs corresponding to one orthogonal code are mapped to I path/Q path position, and meanwhile all PHICHs within the same PHICH group are mapped to the same sub-carriers of the same resource groups.

In other words, PHICHs are evenly allocated into different PHICH groups; when the number of PHICHs in a group is less than or equal to half of the maximum number of PHICHs in each group, the PHICHs in the group is allocated to different orthogonal codes i.e. I path or Q path position; when the number of PHICHs in a group increase gradually to be more than half of the maximum number of PHICHs in each group, the PHICHs gradually increased in each group are further evenly allocated to I/Q positions that are orthogonal to the I/Q positions of the previous PHICHs under k orthogonal codes, i.e., a certain orthogonal code, and an I path or Q path position different from that of an existing PHICH using the orthogonal code are allocated for each newly increased PHICH.

In the present invention, a certain PHICH being distributed to I path (or Q path) position of a certain orthogonal code of a certain PHICH group means that the resources allocated for the PHICH is the PHICH group, the orthogonal code and the I path (or Q path) position, or in other words, the PHICH is mapped to the PHICH group, the orthogonal code and the I path (or Q path) position.

It should be explained here that the so called even dividing means evenly and sequentially allocating a plurality of PHICHs to different PHICH groups as much as possible (the PHICH number of each group is less than or equal to the maximum PHICH number of each group, or the PHICH number of the last group may not reach the maximum PHICH number of each group); similarly, the PHICH number of each orthogonal code and each I/Q path position is also like this. The numbers of PHICHs in various groups are equal or differ by 1.

(2) The Cyclic Prefix is an Extended Cyclic Prefix

Figure 3:
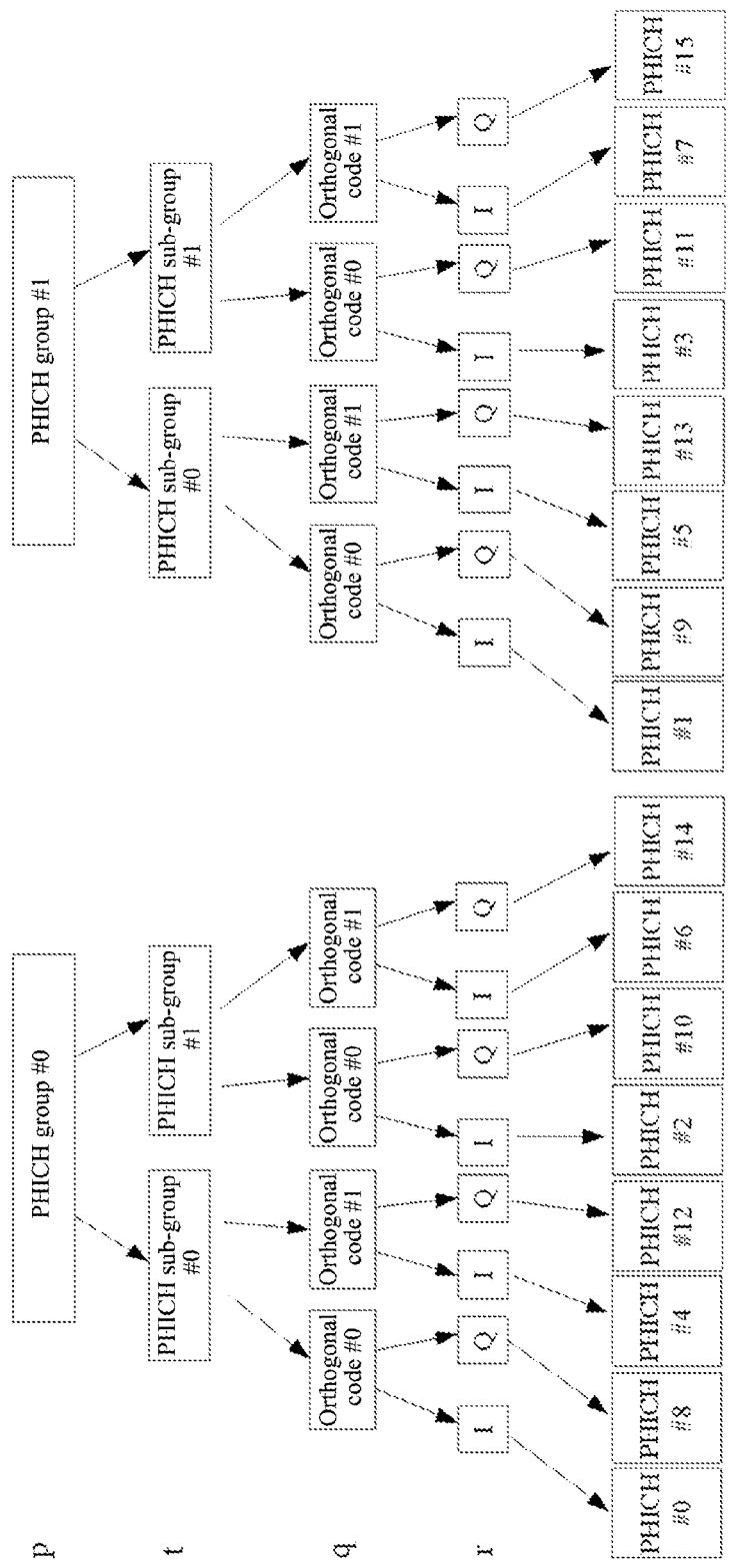
FIG. 3 is a schematic diagram for allocation of PHICH resources when an extended cyclic prefix is used according to one example of the present invention.

All of the PHICHs are mapped according to the following order: PHICH groups→PHICH sub-groups→orthogonal codes→I path or Q path position, and they are sequentially numbered, as shown in FIG. 3.

In order to facilitate mapping, a PHICH group is divided into p PHICH sub-groups, wherein: p=a total of sub-carriers included in the resource groups corresponding to the PHICH group/(times for repeatedly encoding the information transmitted in the PHICH×the number of allocatable orthogonal codes).

Figure 5:
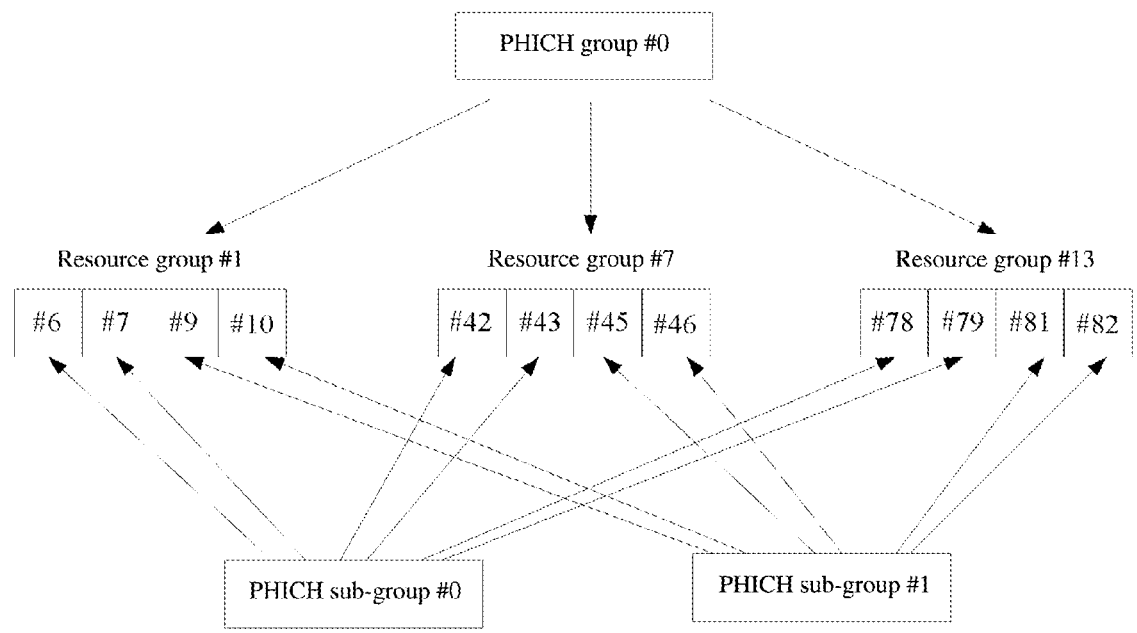
FIG. 5 is a schematic diagram for the mapping relationship between PHICH groups and sub-carriers of resource groups when an extended cyclic prefix is used according to one example of the present invention.

In this example, one PHICH group is divided into two sub-groups: PHICH sub-group #0 and PHICH sub-group #1, wherein the PHICH sub-group #0 is composed of the first two physical sub-carriers in each resource group corresponding to the PHICH group in which the PHICH sub-group #0 is included, and the PHICH sub-group #1 is composed of the last two physical sub-carriers in each resource group corresponding to the PHICH group in which the PHICH sub-group #0 is included, as indicated in FIG. 5.

Assuming that all PHICHs are numbered as (#0, #1, ..., #N−1), PHICH groups are number as (#0, #1, ..., #M−1), orthogonal codes are numbered as (#0, #1, ..., #k−1) and I path and Q path positions are numbered as (#0, #1);

One PHICH group may include 4×k PHICHs, wherein one PHICH group includes 2 PHICH sub-groups, one PHICH sub-group includes k orthogonal codes, and one orthogonal code corresponds to two possible positions of I path and Q path; then the mapping relationship between the PHICH group sequence number p, PHICH sub-group sequence number t, orthogonal code sequence number q, and I/Q path position r corresponding to the $i^{th}$ PHICH is as shown in the following formula:

$$p=i \bmod M, t=\text{floor}(i/M) \bmod 2, q=\text{floor}(\text{floor}(i/M)/2) \bmod k,$$

$$r=\text{floor}(\text{floor}(\text{floor}(i/M)/2)/k) \bmod 2;$$

wherein r=0 means at the I path position, r=1 means at the Q path position; or r=0 means at the Q path position, r=1 means at the I path position.

Similarly, in addition to implementing resource mapping for PHICHs using the above formula, the mapping can also be implemented by way of a table. Assuming that all PHICHs are numbered as (#0, #1, ..., #N−1), PHICH groups are number as (#0, #1, ..., #M−1), the PHICH group sequence number corresponding to the $i^{th}$ PHICH is p, and the corresponding PHICH logic number is s, then:

$$p=i \bmod M; s=\text{floor}(i/M);$$

when the spectrum spreading multiple k=2, one PHICH group may include 8 PHICHs (#0, #1, ..., #7), one resource group may include 2 PHICH sub-groups, each of which may include 4 PHICHs with spectrum spreading codes of $w_0$ and $w_1$, then all PHICHs are firstly evenly divided according to the number of PHICH groups, then PHICHs in one PHICH group are sequentially mapped as indicated in Table 2 (wherein the spectrum spreading codes are orthogonal codes).

TABLE 2 the corresponding relationship between PHICHs and spectrum spreading codes in the case of extended cyclic prefix

| PHICH logic numbers (s) | spectrum spreading codes k = 2 |
| --- | --- |
| 0 | $w_0$ of I path in PHICH sub-group #0 |
| 1 | $w_0$ of I path in PHICH sub-group #1 |

TABLE 2-continued the corresponding relationship between PHICHs and spectrum spreading codes in the case of extended cyclic prefix

| PHICH logic numbers (s) | spectrum spreading codes k = 2 |
| --- | --- |
| 2 | $w_1$ of I path in PHICH sub-group #0 |
| 3 | $w_1$ of I path in PHICH sub-group #1 |
| 4 | $w_0$ of Q path in PHICH sub-group #0 |
| 5 | $w_0$ of Q path in PHICH sub-group #1 |
| 6 | $w_1$ of Q path in PHICH sub-group #0 |
| 7 | $w_1$ of Q path in PHICH sub-group #1 |
| Remarks | PHICH logic numbers are new numbers of all PHICHs after being evenly divided according to the number of PHICH groups | wherein, $w_0$ and $w_1$ may be {1,1}, {1,−1} respectively.

Figure 4:
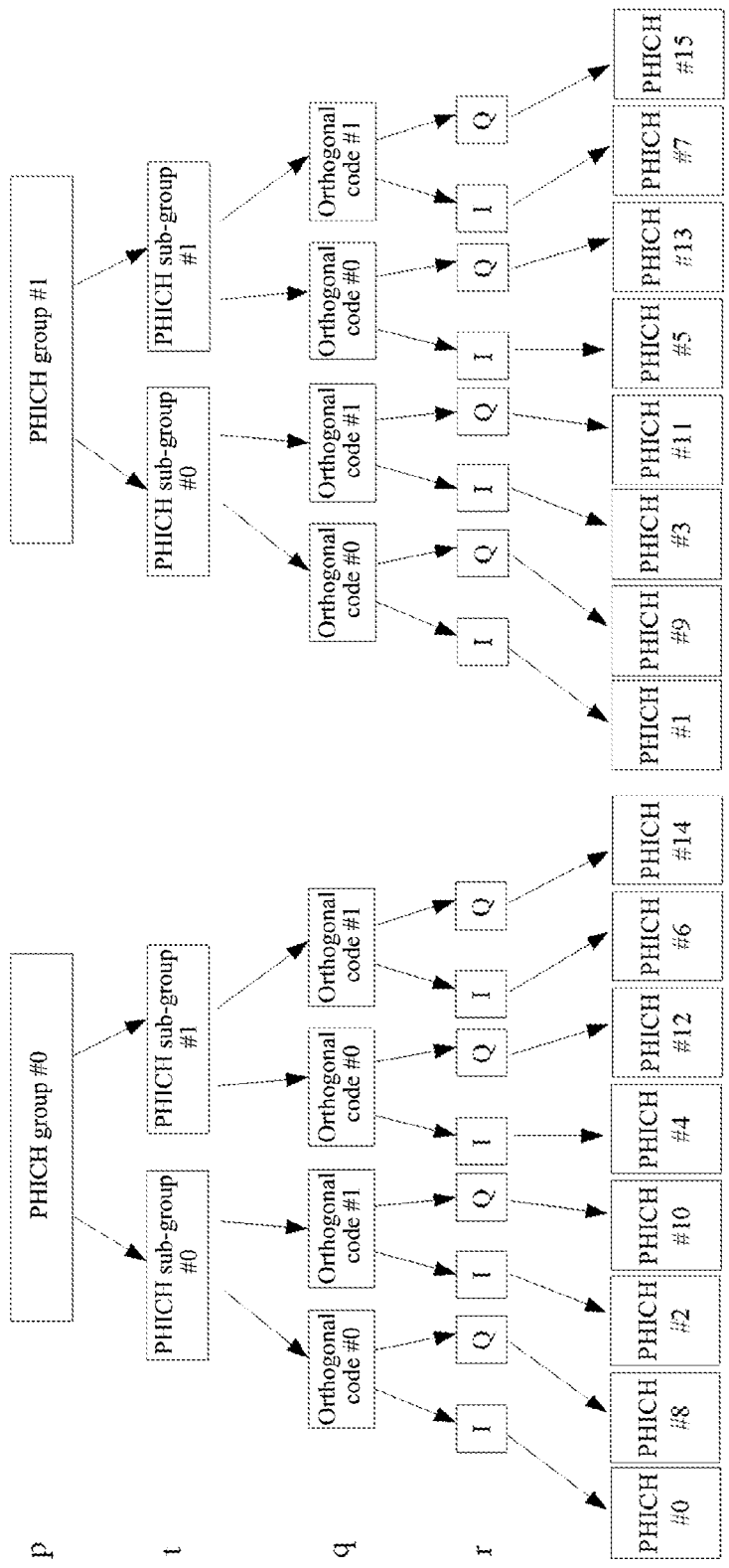
FIG. 4 is a schematic diagram for a variation of allocation of PHICH resources when an extended cyclic prefix is used according to one example of the present invention.

FIG. 4 is a variation of FIG. 3. In one PHICH group, PHICHs are firstly mapped to different sub-group in FIG. 3, while in FIG. 4, PHICHs are firstly mapped to different orthogonal codes of the same sub-group, both of which will do.

When the spectrum spreading multiple k=2, m=3×k=6, then one PHICH (i.e., one ACK/NACK message) corresponds to 6 bits that are respectively mapped to two physical sub-carriers of each resource group among 3 resource groups, then two PHICHs (i.e., the PHICH sub-group #0 and the PHICH sub-group #1 respectively, with a total of 12 bits) can be mapped to the same 3 resource groups for frequency division multiplexing, wherein 6 bits of one PHICH (belonging to the PHICH sub-group #0) are mapped to the first two physical sub-carriers in the 3 resource groups while 6 bits of another PHICH (belonging to the PHICH sub-group #1) are mapped to the last two physical sub-carriers in the 3 resource groups, as shown in FIG. 5.

To sum up, all PHICHs are firstly evenly divided according to the number of the PHICH groups, then PHICHs in each PHICH group are evenly divided into two PHICH sub-groups, afterwards the PHICHs in each PHICH sub-group are evenly divided according to the number of orthogonal codes, and finally, the PHICHs corresponding to one orthogonal code are mapped to I path/Q path position; meanwhile the same I path PHICHs and Q path PHICHs of the same PHICH group are mapped to the same sub-carriers of the same resource groups.

In other words, PHICHs are evenly allocated into different PHICH groups; when the number of PHICHs in a group is less than or equal to half of the maximum number of PHICHs in each group, the PHICHs in the group is allocated to orthogonal codes of different PHICH sub-groups or different orthogonal codes in the same PHICH sub-group and I path or Q path position; when the number of PHICHs in a group increases gradually to be more than half of the maximum number of PHICHs in each group, the PHICHs gradually increased in each group are further evenly allocated to I/Q position that is orthogonal to the I/Q position of the previous PHICHs under k orthogonal codes of different PHICH sub-groups, i.e., a certain orthogonal code, and an I path or Q path position different from that of an existing PHICH using the orthogonal code are allocated for each newly increased PHICH.

In order to facilitate in-depth interpretation of the technical solution of the present invention, some specific examples including the mapping method for PHICH resources of the present invention will be provided below with reference to the drawings.

EXAMPLE 1

When the cyclic prefix is a normal cyclic prefix, the spectrum spreading codes are $\{1, 1, 1, 1\}\{1, -1, 1, -1\}\{1, 1, -1, -1\}\{1, -1, -1, 1\}$, and their sequence numbers are (#0, #1, #2, #3). Assuming that currently there are 16 PHICHs (#0, #1, ..., #15) and two PHICH groups (#0, #1) in the system, then the mapping relationship between the PHICH group sequence number p, orthogonal code sequence number q, and I/Q path position r corresponding to the $i^{th}$ PHICH is generated by the following formula, and the specific mapping is as shown in FIG. 1:

k=4, M=2;
when 1=0, p=0 mod 2=0, q=floor (0/2) mod 4=0, r=floor (floor (0/2)/4) mod 2=0;
when i=1, p=1 mod 2=1, q=floor (1/2) mod 4=0, r=floor (floor (0/2)/4) mod 2=0;
when i=2, p=2 mod 2=0, q=floor (2/2) mod 4=1, r=floor (floor (2/2)/4) mod 2=0;
when i=3, p=3 mod 2=1, q=floor (3/2) mod 4=1, r=floor (floor (3/2)/4) mod 2=0;
. . .
when i=15, p=15 mod 2=1, q=floor (15/2) mod 4=3, r=floor (floor (15/2)/4) mod 2=1;
wherein, r=0 means at the I path position, and r=1 means at the Q path position;

Assuming that PHICH group #0 is mapped to the resource group #1, resource group #7 and resource group #13, the corresponding physical carriers are #6, #7, #9, #10 and #42, #43, #45, #46, as well as #78, #79, #81, #82, and the same I path PHICHs and the same Q path PHICHs in the same PHICH group are both mapped to the same sub-carriers of the same resource groups, as shown in FIG. 2.

EXAMPLE 2

When the cyclic prefix is an extended cyclic prefix, the spectrum spreading codes are $\{1, 1\}$ and $\{1, -1\}$, and their sequence numbers are (#0, #1). Assuming that currently there are 16 PHICHs (#0, #1, ..., #15) and two PHICH groups (#0, #1) in the system, then the mapping relationship between the PHICH group sequence number p, I/Q path position r and orthogonal code sequence number q, as well as PHICH sub-group sequence number t corresponding to the $i^{th}$ PHICH is generated by the following formula, and the specific mapping is as shown in FIG. 3:

k=4, M=2;
when i=0, p=0 mod 2=0, t=floor (0/2) mod 2=0, q=floor (floor (0/2)/2) mod 4=0, r=floor (floor (floor (0/2)/2)/4) mod 2=0;
when i=1, p=1 mod 2=1, t=floor (1/2) mod 2=0, q=floor (floor (1/2)/2) mod 4=0, r=floor (floor (floor (1/2)/2)/4) mod 2=0;
when i=2, p=2 mod 2=0, t=floor (2/2) mod 2=1, q=floor (floor (2/2)/2) mod 4=0, r=floor (floor (floor (2/2)/2)/4) mod 2=0;
when 3, p=3 mod 2=1, t=floor (3/2) mod 2=1, q=floor (floor (3/2)/2) mod 4=0, r=floor (floor (floor (3/2)/2)/4) mod 2=0;
. . .
when i=15, p=15 mod 2=1, t=floor (15/2) mod 2=1, q=floor (floor (15/2)/2) mod 4=3, r=floor (floor (floor (15/2)/2)/4) mod 2=1.
wherein, r=0 means at the I path position, and r=1 means at the Q path position;

Assuming that PHICH group #0 is mapped to the resource group #1, resource group #7 and resource group #13, the corresponding physical carriers are #6, #7, #9, #10 and #42, #43, #45, #46, as well as #78, #79, #81, #82, the physical sub-carriers corresponding to PHICH sub-group #0 of the PHICH group #0 (including 4 PHICHs in the PHICH group #0) are #6, #7 and #42, #43, as well as #78, #79, the physical sub-carriers corresponding to PHICH sub-group #1 of the PHICH group #0 (including another 4 PHICHs in the PHICH group #0) are #9, #10 and #45, #46, as well as #81, #82, and the relationship between the PHICH sub-groups and PHICH group is as shown in FIG. 5.

The present invention is described in detail above with reference to the specific examples, the description of the examples is provided to enable a person having ordinary skill in the art to produce or apply the present invention, and various modifications made to these examples will be easily appreciated by a person having ordinary skill in the art. The present invention is not limited to these examples or certain aspects thereof. The scope of the invention is specifically defined by the attached claims.

INDUSTRIAL APPLICABILITY

The present invention provides a method for allocating physical hybrid ARQ indicator channel resources. Since PHICHs are evenly allocated to different PHICH groups, different I/Q positions under different orthogonal codes (or, of PHICH sub-groups) according to the order of groups, orthogonal codes and orthogonal I/Q positions, thereby achieving the technical effects of maximum resource utilization and minimum signal interference between users and minimum bit error rate.

What we claim is:

1. A method for allocating resources of physical hybrid automatic repeat request indicator channels (PHICHs), comprising:

a transmitting end dividing evenly all resources of the PHICHs to be allocated into a plurality of configured PHICH groups, and then mapping the divided PHICHs to sub-carriers of resource groups corresponding to the PHICH groups to transmit signals in the PHICHs through the sub-carriers;

the transmitting end also allocating orthogonal codes and I path or Q path position resources for PHICHs in each PHICH group;

wherein the transmitting end firstly evenly allocates the PHICHs to different PHICH groups; when the number of PHICHs in a group is less than or equal to half of the maximum number of PHICHs in each group, the PHICHs in the group are allocated to different orthogonal codes and I path or Q path positions of the orthogonal codes; when the number of PHICHs in a group increases gradually to exceed half of the maximum number of PHICHs in each group, a certain orthogonal code, and an I path or Q path position different from that of an existing PHICH using the orthogonal code are allocated for each newly increased PHICH;

if the PHICH groups includes PHICH sub-groups, the transmitting end firstly evenly allocates the PHICHs to different PHICH groups; when the number of PHICHs in a group is less than or equal to half of the maximum number of PHICHs in each group, the PHICHs in the group are allocated to orthogonal codes of different PHICH sub-groups or different orthogonal codes of the same PHICH sub-group, and I path or Q path positions of the orthogonal codes; when the number of PHICHs in a group increases gradually to exceed half of the maximum number of PHICHs in each group, a certain orthogonal code and an I path or Q path position different from that of an existing PHICH using the orthogonal code are allocated for each newly increased PHICH.

2. The method according to claim 1, wherein the method is applied to a Long Term Evolution system, the PHICHs are used to transmit ACK/NACK (Acknowledged/Non-acknowledged) messages related to uplink data, one PHICH corresponds to one ACK/NACK message, and one ACK/NACK message becomes m bits after encoding repeatedly and spectrum spreading, where m=3×k, k is spectrum spreading multiple; after modulation, m bits are respectively mapped to 3 resource groups, each of which includes 4 physical sub-carriers;

when a cyclic prefix is a normal cyclic prefix, k=4, one PHICH group includes at most 2×k PHICHs, one PHICH group includes k different orthogonal codes, and one orthogonal code corresponds to two positions of the I path and the Q path.

3. The method according to claim 2, wherein, as for all PHICH sequence numbers of #0, #1, ..., #N−1, and all PHICH group sequence numbers of #0, #1, ..., #M−1, the PHICH group sequence number corresponding to the $i^{th}$ PHICH is p, the corresponding PHICH logical number is s in the PHICH group p, then the PHICH group sequence number p and the PHICH logical number s are determined according to the following formula:

$$p=i \bmod M; s=\text{floor}(i/M);$$

wherein: "mod" indicates modulo operation, floor( ) is a round-down function, M is a number configured for the PHICH groups;

said orthogonal codes include a first orthogonal code $w_0$, a second orthogonal code $w_1$, a third orthogonal code $w_2$ and a fourth orthogonal code $w_3$, and as for all of the PHICHs evenly divided according to the number M of the PHICH groups, a mapping relationship determined according to the PHICH logic number s in one PHICH group is as follows: PHICHs with a logic number s of 0, 1, 2 and 3 are sequentially mapped to $w_0, w_1, w_2$ and $w_3$ of the I path, and PHICHs with a logic number s of 4, 5, 6 and 7 are sequentially mapped to $w_0, w_1, w_2$ and $w_3$ of the Q path.

4. The method according to claim 2, wherein, when dividing the PHICHs and allocating orthogonal codes and I path or Q path position resources for the PHICHs, the mapping relationships between PHICH group sequence number p, an orthogonal code sequence number q, and I path or Q path position r corresponding to the $i^{th}$ PHICH are respectively as indicated with the following formulas:

$$p=i \bmod M; q=\text{floor}(i/M) \bmod k; r=\text{floor}(\text{floor}(i/M)/k) \bmod 2;$$

wherein: "mod" indicates modulo operation, floor( ) is a round-down function, M is a number configured for the PHICH groups.

5. The method according to claim 1, wherein the method is applied to a Long Term Evolution system, the PHICHs are used to transmit ACK/NACK (Acknowledged/Non-acknowledged) messages related to uplink data, one PHICH corresponds to one ACK/NACK message, and one ACK/NACK message becomes m bits after encoding repeatedly and spectrum spreading, where m=3×k, k is spectrum spreading multiple; after modulation, m bits are respectively mapped to 3 resource groups, each of which includes 4 physical sub-carriers;

when a cyclic prefix is an extended cyclic prefix, k=2, one PHICH group includes at most 4×k PHICHs, one PHICH group includes 2 PHICH sub-groups, one PHICH sub-group includes k different orthogonal codes, and one orthogonal code corresponds to two positions of the I path and the Q path.

6. The method according to claim 5, wherein, as for all PHICH sequence numbers of #0, #1, ..., #N−1, and all PHICH group sequence numbers of #0, #1, ..., #M−1, the PHICH group sequence number corresponding to the $i^{th}$ PHICH is p, the corresponding PHICH logical number is s in the PHICH group p, then the PHICH group sequence number p and the PHICH logical number s are determined according to the following formulas:

$$p=i \bmod M; s=\text{floor}(i/M);$$

wherein: "mod" indicates modulo operation, floor( ) is a round-down function, M is a number configured for the PHICH groups;

said orthogonal codes include a first orthogonal code $w_0$ and a second orthogonal code $w_1$, and as for all of the PHICHs evenly divided according to the number M of the PHICH groups, a mapping relationship determined according to the PHICH logic number s in one PHICH group is as follows: PHICHs with a logic number s of 0, 1 are sequentially mapped to $w_0$ of the I path of the first PHICH sub-group and $w_0$ of the I path of the second PHICH sub-group; PHICHs with a logic number s of 2, 3 are sequentially mapped to $w_1$ of the I path of the first PHICH sub-group and $w_1$ of the I path of the second PHICH sub-group; PHICHs with a logic number s of 4, 5 are sequentially mapped to $w_0$ of the Q path of the first PHICH sub-group and $w_0$ of the Q path of the second PHICH sub-group; PHICHs with a logic number s of 6, 7 are sequentially mapped to $w_1$ of the Q path of the first PHICH sub-group and $w_1$ of the Q path of the second PHICH sub-group.

7. The method according to claim 5, wherein, when dividing the PHICHs and allocating orthogonal codes and I path or Q path position resources for the PHICHs, the mapping relationships between PHICH group sequence number p, a PHICH sub-group sequence number t, an orthogonal code sequence number q and I path or Q path position r corresponding to the $i^{th}$ PHICH are respectively as indicated with the following formulas:

$$p=i \bmod M; t=\text{floor}(i/M) \bmod 2; q=\text{floor}(\text{floor}(i/M)/2) \bmod k;$$

$$r=\text{floor}(\text{floor}(i/M)/2)/k) \bmod 2;$$

wherein: "mod" indicates modulo operation, floor( ) is a round-down function, M is a number configured for the PHICH groups.

8. The method according to claim 6, wherein,
the PHICHs at the same I path position and the PHICHs at the same Q path position within the first PHICH sub-group are mapped to two sub-carriers in the same resource group;
the PHICHs at the same I path position and the PHICHs at the same Q path position within the second PHICH sub-group are mapped to the other two sub-carriers in the same resource group.

9. The method according to claim 7, wherein,
the PHICHs at the same I path position and the PHICHs at the same Q path position within the first PHICH sub-group are mapped to two sub-carriers in the same resource group;

the PHICHs at the same I path position and the PHICHs at the same Q path position within the second PHICH sub-group are mapped to the other two sub-carriers in the same resource group.

* * * * *